July 23, 1957  M. P. TEIXEIRA  2,799,972
SYMPODIAL ORCHIDS AND OTHER RHIZOMATOUS PLANTS GROWING VESSEL
Filed May 4, 1955
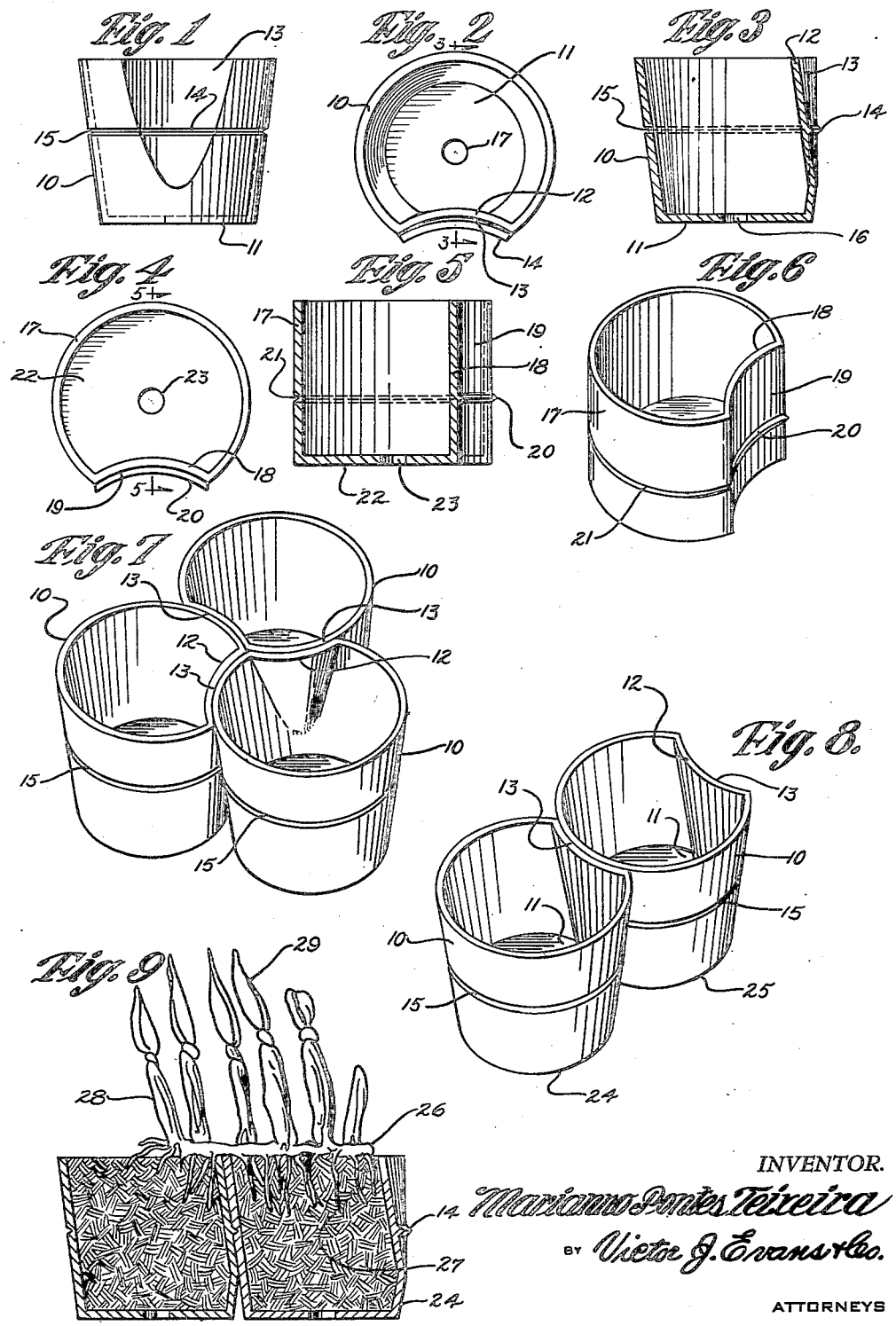
INVENTOR.
Marianno Pontes Teixeira
BY Victor J. Evans & Co.
ATTORNEYS ly patent office
2,799,972
Patented July 23, 1957

2,799,972

SYMPODIAL ORCHIDS AND OTHER RHIZOMATOUS PLANTS GROWING VESSEL

Marianno Pontes Teixeira, Recife, Pernambuco, Brazil

Application May 4, 1955, Serial No. 506,044

4 Claims. (Cl. 47—34)

This invention relates to vessels or pots used in the orchid growing industry and particularly orchids of the sympodial genera and other rhizomatous plants wherein additional plants are produced by new shoots and wherein roots of the new shoots grow over the rim of a pot in which the plant is positioned and wherein removal of a plant, such as in transplanting, causes a check in the growth, and in particular, another pot nested against the periphery of a pot in which the plant is positioned with the additional pot nested at the point where the new shoot is about to grow over the rim of the former pot whereby with the pots secured together until the plant formed by the new shoot is securely rooted in the additional pot and such as after a period of two or three years the pots may be separated with the new shoot rooted in the pot nested against the pot in which the former plant is positioned.

The purpose of this invention is to provide means for reproducing plants, such as sympodial orchids and other rhizomatous plants, by introducing nesting pots whereby a pot may be positioned against the surface of a pot containing a plant so that soil in the pot nested against the former pot is adapted to be positioned to receive roots of a shoot about to grow over the rim of the former pot.

By this means a method of reproducing sympodial orchids and other rhizomatous plants is provided in which the new plants are not transplanted and wherein the roots of the new plants are not disturbed.

In growing sympodial orchids and other rhizomatous plants, new plants are produced by buds which originate in scale-like leaves at the base of a stem formed by a shoot of the previous year, the lower part of each new shoot being prostrate at first and often below the surface or positioned on the surface of the medium in which the plant is growing. Each new shoot will bring forth, at the proper time, a great number of new roots and these roots are more important to the plant than the old or former roots. In the conventional manner of growing plants of this type when, after a period of two or three years, one or more of such shoots is about to grow over the rim of the pot, the operation of repotting takes place. Without this step of repotting or transplanting, there would be no rooting medium for the new shoots. The repotting or transplanting of the plants, that is, the removal of the plant, either to place it into a larger pot or for cutting the plant down to a convenient size, checks the growth unless very special precautions are taken. With this thought in mind, this invention contemplates eliminating the necessity for repotting and transplanting by nesting an additional pot against the sides of the pot in which the parent plant is positioned with the new pot nested at the point where the new shoot is about to grow over the rim. By this means the roots of the new shoot penetrate the soil of the additional or nested pot, and should there be more than one new shoot, additional pots may be nested against the periphery of the pot of the parent plant.

After being positioned to receive the roots of a shoot passing over the rim of a pot, the pots are nested together and secured by a loop of wire over an elastic band and the pots remain in assembled relation for two or three years, at which time they may be severed.

The object of this invention is, therefore, to provide means for nesting pots for sympodial orchids and other rhizomatous plants whereby as a new shoot starts to grow over the rim of a container or pot another pot may be nested at the point where the new shoot is positioned so that roots of the new shoot will extend into the soil of the nested pot.

Another object of the invention is to provide means for forming pots for use in the culture of sympodial orchids and other rhizomatous plants whereby individual pots are readily positioned at points where new shoots of plants are about to grow over the rim of a pot or container in which the plants are positioned.

Another object of the invention is to provide improvement in the culture of sympodial orchids and other rhizomatous plants wherein pots nested against a container in which a plant is positioned at a point where a new shoot is about to grow over the rim of the container are located vertically by ridges and grooves and wherein the nested pot or pots may be retained in position by a wire, staple, elastic band, or the like.

A further object of the invention is to provide means for nesting a pot against the peripheral surface of a pot containing a sympodial orchid or other rhizomatous plant and at a point where a new shoot is about to grow over the rim of the pot in which the pots are of simple and economical construction.

With these and other objects and advantages in view, the invention embodies a pot, preferably frustoconical or cylindrical shape having an arcuate recess, the radius of which corresponds with the radius of the pot in one side and having a horizontally disposed ridge positioned in the recess and a corresponding groove in the surface of the side opposite to that in which the recess is positioned.

Other features and advantages of the invention will appear from the following description, taken in connection with the drawing, wherein:

Figure 1 is a side elevational view of a frustoconical shaped pot having a recess in one side, said view looking toward the side in which the recess is positioned.

Figure 2 is a plan view of the pot shown in Figure 1.

Figure 3 is a cross section through the pot shown in Figures 1 and 2 being taken on line 3—3 of Figure 2.

Figure 4 is a plan view similar to that shown in Figure 2 showing a cylindrical shaped pot.

Figure 5 is a cross section through the pot shown in Figure 4 being taken on line 5—5 thereof.

Figure 6 is a perspective view illustrating the pot shown in Figures 4 and 5.

Figure 7 is a perspective view showing a plurality of pots, as illustrated in Figures 1, 2 and 3 in nested positions.

Figure 8 is a perspective view showing two of the pots as illustrated in Figures 1, 2 and 3 nested.

Figure 9 is a typical cross section through the nested pots illustrating the formation of plants such as orchids or other rhizomatous plants growing from a horizontally disposed root positioned on nested pots.

Referring now to the drawing, wherein like reference characters denote corresponding parts, the improved vessel or pot for orchids and other rhizomatous plants includes a hollow body having a circular wall 10 with a base 11 in the lower end and having an arcuate section 12 providing a recess 13 at one point in the wall thereof.

A rib 14 positioned in the recess and extended from the surface of the arcuate wall 12 coacts with a similarly shaped groove 15 in the wall 10, the groove 15 extending from one side of the recess, around the body and terminating at the opposite side of the recess whereby a second pot having a similar recess, ridge, and groove is adapted to be positioned against the first pot with the key or ridge 14 extended into the groove 15. In the design shown, the ridge or tongue 14 is triangular shaped in cross section, however, it will be understood that both the ridge and groove may be of any other suitable shape.

The upper end of the body is open and a drain opening 16 is provided in the base 11 similar to the drain opening of a conventional flower pot.

In the design illustrated in Figures 1, 2, 3, 7 and 8, the body of the pot is frusto-conical shaped and in Figures 4, 5 and 6 a similar pot is illustrated in which the body is formed with a cylindrical wall 17 and the wall 17 is provided with an arcuate section 18 providing a recess 19. A ridge or tongue 20 provided in the recess 19 is positioned to extend into a groove 21 which extends from one side of the recess to the other, around the body of the pot and, as shown in Figures 4 and 5, the cylindrical pot is provided with a base 22 and the base is provided with an opening 23, similar to the opening 17.

Vessels or pots formed with the arcuate recesses at one point in the wall thereof are adapted to be nested as illustrated in Figures 7 and 8 wherein with the radius of the wall of the recess corresponding to the radius of the wall of the pot the wall of one pot extends into the recess of another, as shown in Figure 8, and the pot, which is indicated by the numeral 24, is adapted to be positioned at a point where a shoot of a plant is about to grow over the rim of a pot whereby roots from the shoot will extend into material in the nested pot, which is indicated by the numeral 24, the pot of the original plant being indicated by the numeral 25, with the shoot or shoots of the plant of the pot 25 being adapted to start at any suitable point or points on a stem which is of scale-like leaves, as indicated by the numeral 26, the roots 27 will extend into the nested pot 24 with the shoots or bulbs 28 extended upwardly and with the leaves or flowers, as indicated by the numeral 29, extended upwardly from the bulbs or shoots.

It will be understood that modifications, within the scope of the appended claims, may be made in the design and arrangement of the parts without departing from the spirit of the invention.

What is claimed is:

1. A pot having a circular wall, open at the upper end and having a base in the lower end, and said wall having an arcuate recess therein, the radius of the recess being equal to the radius of the wall, said recess having a horizontally disposed ridge therein and said circular wall having a horizontally disposed groove positioned to receive the ridge of the recess of a similar pot.

2. A pot comprising a hollow body having an inverted frusto-conical shaped wall open at the upper end and having a base with an opening therein in the lower end and said wall having an inwardly extended arcuate section therein, said arcuate section providing a recess and the radius at the upper end of the recess being equal to the radius of the outside of the wall at the upper end of the pot, said recess having a horizontally disposed ridge therein and the wall of the pot having a horizontally disposed groove positioned to receive the ridge of the recess of a similar pot.

3. A pot comprising a hollow body having a cylindrical wall open at the upper end and having a base with an opening therein in the lower end and said wall having an inwardly extended arcuate section providing an arcuate recess therein, said arcuate recess having a horizontally disposed tongue extended from the surface thereof and said cylindrical wall having a groove extended from one side of the recess to the other and positioned to receive the tongue of the recess of a similar pot.

4. In combination, a plurality of pots arranged contiguous to each other in nesting relation with respect to each other, each pot including a hollow body having a base in the lower end thereof, said body further including a side wall provided with a recess, said recess adapted to snugly receive a portion of a similar pot, the side wall of said pot being provided with a groove, a rib extending outwardly from said recess and said rib projecting into a groove of an adjacent pot, the upper end of said body being open, there being a drainage opening in the bottom of each pot.

References Cited in the file of this patent

UNITED STATES PATENTS

| D. 139,569 | O'Brien | Nov. 28, 1944 |
| 837,977 | Thornton | Dec. 11, 1906 |

FOREIGN PATENTS

| 496,474 | Belgium | July 15, 1950 |
| 487,391 | France | Apr. 8, 1918 |
| 142,393 | Great Britain | May 6, 1920 |
| 283,128 | Italy | Mar. 2, 1931 |